United States Patent
Hong et al.

(10) Patent No.: US 10,811,887 B2
(45) Date of Patent: *Oct. 20, 2020

(54) CHARGING VOLTAGE SUPPLY APPARATUS AND SUPPLY METHOD

(71) Applicant: LG CHEM, LTD., Seoul (KR)

(72) Inventors: Sung Ju Hong, Cheongju-Si (KR); Ho Chol Nam, Cheongju-Si (KR); Hak In Kim, Cheongju-Si (KR); Seog Jin Yoon, Cheongju-Si (KR)

(73) Assignee: LG CHEM, LTD., Seoul (KR)

( * ) Notice: Subject to any disclaimer, the term of this patent is extended or adjusted under 35 U.S.C. 154(b) by 163 days.

This patent is subject to a terminal disclaimer.

(21) Appl. No.: 16/076,461

(22) PCT Filed: Oct. 17, 2017

(86) PCT No.: PCT/KR2017/011446
§ 371 (c)(1),
(2) Date: Aug. 8, 2018

(87) PCT Pub. No.: WO2018/074808
PCT Pub. Date: Apr. 26, 2018

(65) Prior Publication Data
US 2019/0052099 A1  Feb. 14, 2019

(30) Foreign Application Priority Data
Oct. 21, 2016 (KR) .................. 10-2016-0137839

(51) Int. Cl.
*H02J 7/04* (2006.01)
*H02J 7/00* (2006.01)
*H01M 10/42* (2006.01)

(52) U.S. Cl.
CPC .......... *H02J 7/0019* (2013.01); *H01M 10/42* (2013.01); *H02J 7/00* (2013.01); *H02J 7/0021* (2013.01);
(Continued)

(58) Field of Classification Search
CPC ...................................................... H02J 7/0019
(Continued)

(56) References Cited

U.S. PATENT DOCUMENTS 5,528,122 A * 6/1996 Sullivan ................ H02J 7/0018
320/118
6,208,117 B1 * 3/2001 Hibi ...................... H02J 7/0031
320/134

(Continued)

FOREIGN PATENT DOCUMENTS

EP  2 315 336 A1  4/2011
EP  2 362 480 A2  8/2011
(Continued)

OTHER PUBLICATIONS

European Search Report for Appl. No. 17861491.3 dated Jan. 7, 2019.
(Continued)

*Primary Examiner* — Yalkew Fantu
(74) *Attorney, Agent, or Firm* — Birch, Stewart, Kolasch & Birch, LLP

(57) ABSTRACT

The present invention relates to an apparatus and method for providing a charging voltage, and more particularly, to an apparatus and method for providing a charging voltage, which rapidly provide a stable charging voltage to a corresponding cell through a cell balancing voltage source that is one of two separate charging voltage sources, when cell balancing is necessary.

9 Claims, 2 Drawing Sheets

(52) U.S. Cl.
CPC .......... *H02J 7/0047* (2013.01); *H02J 7/0048* (2020.01); *H02J 7/0049* (2020.01); *H02J 7/00714* (2020.01); *H02J 7/007184* (2020.01); *H02J 7/04* (2013.01); *H02J 7/045* (2013.01); *H02J 2207/40* (2020.01)

(58) Field of Classification Search
USPC ........................................................ 320/162
See application file for complete search history.

(56) References Cited

U.S. PATENT DOCUMENTS

| | | | | |
|---|---|---|---|---|
| 6,867,567 | B2* | 3/2005 | Yokota | H02J 7/0047 320/134 |
| 7,489,106 | B1 | 2/2009 | Tikhonov | |
| 8,994,337 | B2 | 3/2015 | Kim | |
| 2004/0135544 | A1* | 7/2004 | King | B60L 58/22 320/116 |
| 2004/0135546 | A1* | 7/2004 | Chertok | H01M 10/441 320/118 |
| 2008/0218127 | A1 | 9/2008 | Kao et al. | |
| 2010/0194339 | A1* | 8/2010 | Yang | H02J 7/0016 320/116 |
| 2017/0279283 | A1 | 9/2017 | Kim et al. | |

FOREIGN PATENT DOCUMENTS

| | | |
|---|---|---|
| EP | 2 536 001 a1 | 12/2012 |
| JP | 2001-008373 A | 1/2001 |
| JP | 2003-157908 A | 5/2003 |
| JP | 2009-247195 A | 10/2009 |
| JP | 2010-29050 A | 2/2010 |
| JP | 2010-045923 A | 2/2010 |
| JP | 2012-524517 A | 10/2012 |
| JP | 2013-247772 A | 12/2013 |
| JP | 2014-054168 A | 3/2014 |
| KR | 10-2009-0092890 A | 9/2009 |
| KR | 10-0969589 B1 | 7/2010 |
| KR | 10-2011-0117992 A | 10/2011 |
| KR | 10-2013-0031204 A | 3/2013 |
| KR | 10-2016-0007740 A | 1/2016 |
| KR | 10-2016-0038348 A | 4/2016 |
| KR | 10-1667913 B1 | 10/2016 |
| WO | WO 2013/035963 A1 | 3/2013 |
| WO | WO 2013/047973 A1 | 4/2013 |

OTHER PUBLICATIONS

International Search Report issued in PCT/KR2017/011446 (PCT/ISA/210), dated Feb. 7, 2018.

* cited by examiner

【Fig. 1】
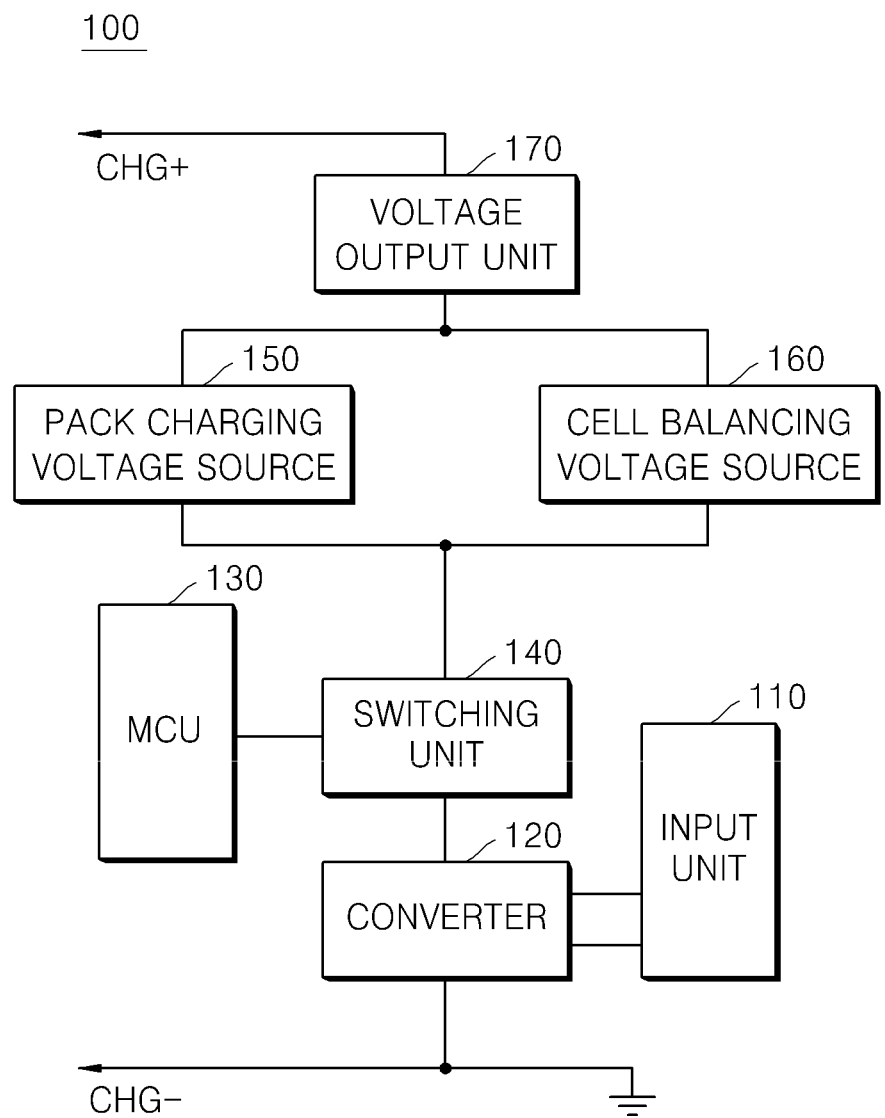

[Fig. 2]
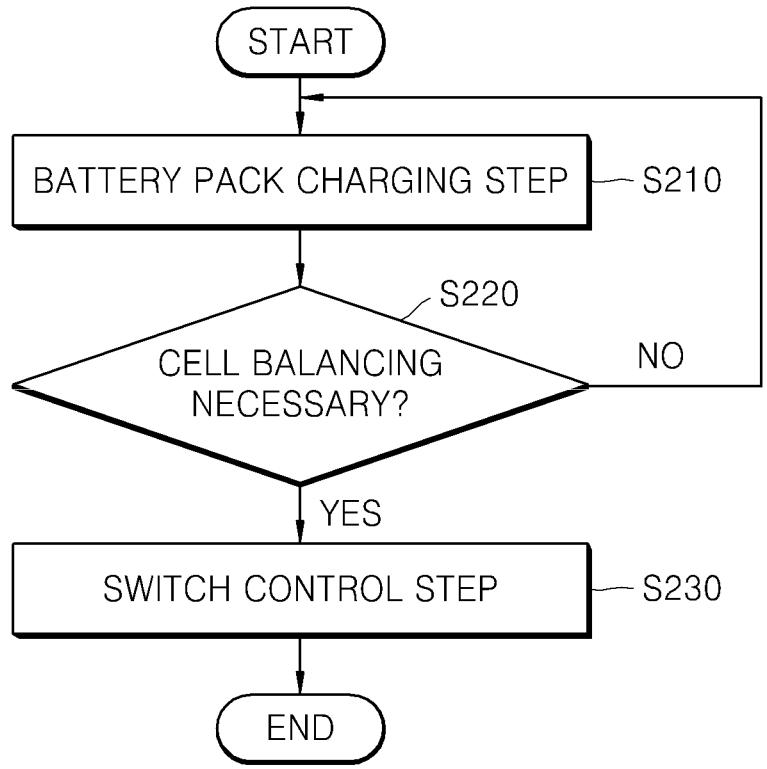
[Fig. 3]
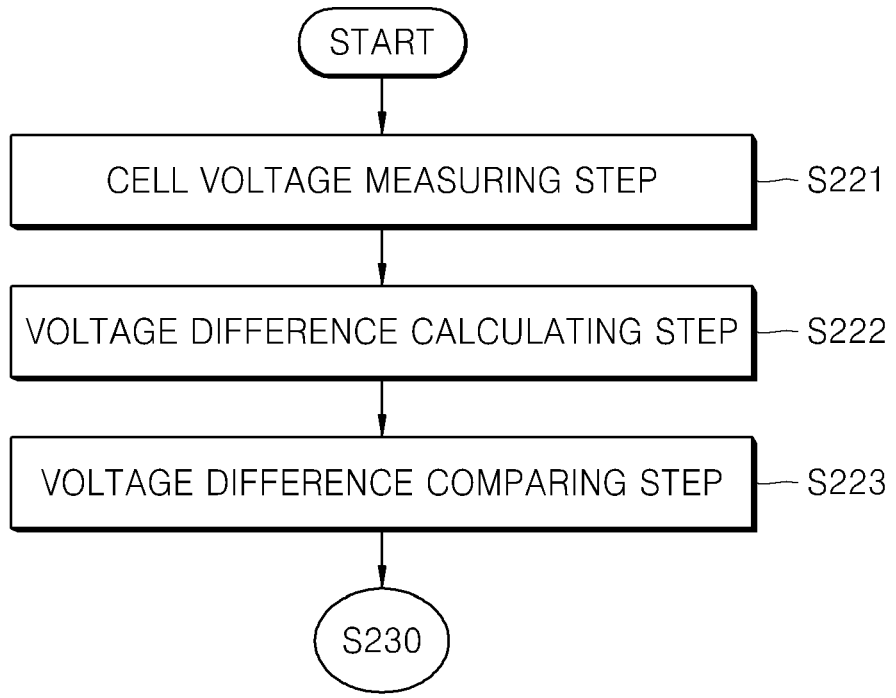

CHARGING VOLTAGE SUPPLY APPARATUS AND SUPPLY METHOD

TECHNICAL FIELD

The present invention relates to an apparatus and method for providing a charging voltage, and more particularly, to an apparatus and method for providing a charging voltage, which rapidly provide a stable charging voltage to a corresponding cell through a cell balancing voltage source that is one of two separate charging voltage sources, when cell balancing is necessary.

BACKGROUND ART

A battery such as a lithium ion cell is sued as a power source for various electronic devices. Typically, a battery (pack) is configured from a plurality of unit cells, and for the plurality of cells, charging voltages thereof become differed due to an individual difference in dynamic state caused by a Coulombic efficiency and capacity, as operation time passes.

This may cause a total discharge capability of the battery to be permanently limited, when at least one cell has a very lower charging voltage than other cells.

In addition, this may also cause a total charge amount of the battery to be permanently limited, when at least one cell has a very higher charging voltage than other cells.

When one cell has a limiting value of the lowest charging voltage and another cell has a limiting value of the highest charging voltage, the battery may not be charged or discharged, although all other cells respectively have proper charging voltages.

In addition, even in a case where charging/discharging is repeated, imbalance between cell voltages occurs and thus the battery lifetime is shortened and an energy efficiency of the battery cell decreases.

Furthermore, when cell voltage imbalance occurs in a complete product, it is difficult to provide an after-sales service to each cell, which may lead to a costly exchange of the battery pack itself.

Thus, cell balancing is necessary for the battery pack, and the cell balancing means to control an individual voltage charged in a cell to be maintained within an allowed range on the basis of a constant level.

On the other hand, a typical cell balancing scheme uses a scheme that makes the entire cells have a uniform value by applying a high level cell voltage across a resistor to consume the cell voltage as heat energy, or by moving a voltage of a cell having a high level to a cell having a low level by means of an energy storage element such as an inductor or a capacitor. Therefore, a method has been used in which cell balancing is performed by a charger for providing a pack charging voltage capable of only charging a battery pack, but a method has not been proposed in which cell balancing is simply performed by individually charging each cell in which imbalance occurs.

Accordingly, it is necessary to develop a technology capable of rapidly and efficiently charging each cell in which imbalance occurs, at the time of performing cell balancing.

PRIOR ART REFERENCES

Korean application publication No. 10-2016-0038348

DISCLOSURE OF THE INVENTION

Technical Problem

The present invention provided an apparatus and method for providing a charging voltage, which is capable of rapidly and efficiently charging each cell in which imbalance occurs.

Technical Solution

An apparatus for providing a charging voltage according to an embodiment of the present invention, which provides a charging voltage through two voltage sources for providing different voltages, includes: an input unit for receiving AC input power from an outside; a converter for converting the AC input power from the input unit to DC input power; an MCU for controlling such that a voltage of the DC input power from the converter is delivered to one of the two voltage sources; and a switching unit connected to one voltage source circuit between the two voltage sources according to a control of the MCU and for delivering the voltage of the DC input power, wherein the two voltage sources is configured from: a pack charging voltage source for converting the voltage of the DC input power to output a pack charging voltage so as to charge a battery pack configured from two or more battery cells; and a cell balancing voltage source for converting the voltage of the DC input power to output a cell balancing voltage so as to charge a battery cell, which requires cell balancing, among the two or more battery cells.

The apparatus may further include a voltage output unit for receiving voltages from the pack charging voltage source and the cell balancing voltage source to output the voltages to the battery pack or the two or more battery cells.

The switching unit may be configured from a plurality of switches connected to the MCU and the converter.

A method for providing a voltage so as to make voltages of two or more battery cells uniform according to the present invention, includes: a battery pack charging step for charging a battery pack configured from the two or more battery cells; a cell balance checking step for checking whether cell balancing is necessary for a cell in the battery pack being in charge due to occurrence of voltage imbalance in the cell; and a switch control step for controlling a switch to connect a circuit having been connected to a pack charging voltage source to a cell balancing voltage source so as to provide a cell balancing voltage to a cell, when it is checked that the cell balancing is necessary for the corresponding cell.

The cell balance checking step may include: a cell voltage measuring step for periodically measuring each voltage of the two or more battery cells; a voltage difference calculating step for calculating a voltage difference between cells using the two or more battery cell voltages measured in the cell voltage measuring step; and a voltage difference comparing step for comparing the voltage difference between cells calculated in the voltage difference calculating step with a voltage difference in a preset prescribed range.

When the voltage difference between cells is greater than the voltage difference in the preset prescribed range in the voltage difference comparing step, the switch control step may be performed.

In the switch control step, a switch for connecting the converter and the pack charging voltage source may be turned off, and a switch for connecting the converter and the cell balancing voltage source may be turned on.

When additional charging is necessary for the battery pack after termination of the cell balancing, a switch of a circuit in which the converter and the cell balancing voltage source are connected may be turned off so as to perform cell balancing, and a switch for the converter, and the pack charging voltage source may be turned on so as to be connected to a battery pack charging circuit again.

When it is determined that charging of the battery pack is completed after termination of the cell balancing, a switch of a circuit in which the converter and the cell balancing voltage source is connected may be turned off.

Advantageous Effects

An apparatus and method for providing a charging voltage according to an embodiment of the present invention may perform rapid and efficient cell balancing by providing a cell balancing voltage to a corresponding cell by additionally configuring a cell balancing voltage source to an existing charger, when voltage imbalance occurs in the cell.

BRIEF DESCRIPTION OF THE DRAWINGS

FIG. 1 is a block diagram of an apparatus for providing a charging voltage according to an embodiment of the present invention;

FIG. 2 is a flowchart of a method for providing a charging voltage according to an embodiment of the present invention; and FIG. 3 is a flowchart of a cell balance checking step in the method for providing a charging voltage.

MODE FOR CARRYING OUT THE INVENTION

Hereinafter, embodiments of the present invention will be described in detail with reference to the accompanying drawings. However, the present invention is not restricted or limited by the embodiments. Rather, the embodiments are provided so that the disclosure of the present invention is thorough and complete and fully conveys the scope of the present invention to those skilled in the art.

The term "first", "second" or the like may be used for describing various elements but does not limit the elements. Such terms are only used for distinguishing one element from other elements. For example, without departing the scope of the present invention, a first element may be referred to as a second element, and likewise, a second element may be referred to as a first element. The terminology used herein is not for delimiting the present invention but for describing specific embodiments. The terms of a singular form may include plural forms unless otherwise specified.

The terms used herein have been selected from among general terms that are widely used at the present time in consideration of the functions of the present invention, but may be changed depending on intentions of those skilled in the art, judicial precedents, or the advent of new technology. Furthermore, specific terms have been arbitrarily selected by the applicant, and the meanings of such terms will be described in detail in relevant sections of the description. Therefore, it should be understood that the terms used herein should not be simply defined literally but should be defined on the basis of the meanings of the terms and the overall contents of the present invention.

1. An Apparatus for Providing a Charging Voltage According to an Embodiment of the Present Invention An apparatus for providing a charging voltage of the present invention additionally configures a cell balancing voltage source to a pack charging voltage source and provides a cell balancing voltage so as to charge a corresponding cell, when the cell balancing is necessary.

FIG. 1 is a block diagram of an apparatus for providing a charging voltage according to an embodiment of the present invention.

Referring to FIG. 1, the apparatus for providing a charging voltage 100 includes an input unit 110 for receiving an AC input power from the outside, as a charging voltage is provided through two voltage sources which provide different voltages, a converter 120 for converting the AC input power from the input unit 110 to a DC input power so as to be able to charge a battery pack, an micro-controller unit (MUC) 130 for command that a voltage of the DC input power from the converter 120 is delivered to one of the two voltage sources, and a switching unit 140 connected to one of the two voltage sources according to a command from the MCU 130 to deliver the voltage of the DC input power.

Here, the converter 120 is electrically connected to the ground.

In addition, the cells of the battery pack are connected in parallel to raise the capacity of the battery pack and have a constant voltage.

On the other hand, a configuration of the apparatus for providing a charging voltage will be described in detail.

The two voltage sources indicate a pack charging voltage source 150 for providing a pack charging voltage so as to charge the battery pack, and a cell balancing voltage source 160 for providing a cell balancing voltage to a cell requiring cell balancing among multiple battery cells that configure the battery pack.

In detail, when the cell balancing is necessary, the cell balancing voltage source 160 may perform conversion on the voltage of the DC input power to output a prescribed cell balancing voltage such that the cell balancing voltage is provided to the corresponding cell to perform cell balancing.

Here, as an embodiment, the pack charging voltage is set to 16.8 V, but is not limited thereto.

In addition, the prescribed cell balancing voltage is set to 5 V as an embodiment, but is not limited thereto.

Moreover, the pack charging voltage source 150 and the cell balancing voltage source 160 respectively further include configurations for decreasing the voltage of the DC input power converted by the converter 120 to a proper output voltage.

The cell balancing voltage source 160 decreases input external power to a voltage necessary for balancing the battery cells and outputs the voltage. To this end, the cell balancing voltage source 160 may include a voltage drop circuit for receiving the external input voltage and decreasing the external input voltage to the cell balancing voltage.

The pack charging voltage source 150 decreases input external power to a voltage necessary for charging the battery pack and output the voltage. To this end, the pack charging voltage source 150 may include a voltage drop circuit for receiving the external input voltage and decreasing the external input voltage to the pack charging voltage.

The outputs of the pack charging voltage source 150 and the cell balancing voltage source 160 may be delivered to the battery pack or the plurality of battery cells through the voltage output unit 170.

In addition, the MCU 130 is controlled by a battery management system (BMS, not shown) of the battery pack, and the MCU 130 and the BMS communicates to each other. The communication may be performed by means of an internal communication scheme such as I2C, SMBus, CAN, UART and SPI, and may transmit commands.

For example, when determining that cell balancing is necessary, the BMS stops providing a pack charging voltage to the MCU 130 and transmits a command for switching the pack charging voltage to the cell balancing voltage to provide the cell balancing voltage.

In addition, after completion of the cell balancing, when determining that a provision of an addition pack charging voltage is necessary, the BMS transmits a command for stopping the provision of the cell balancing voltage and switching the cell balancing voltage to a pack charging voltage to provide the pack charging voltage.

Furthermore, the switching unit 140 is configured from a plurality of switches connected to the MCU 130 to be controlled such that the converter 120 is connected to or disconnected from the pack charging voltage source 150 or the cell balancing voltage source 160. When receiving a command for performing cell balancing from the MCU 130, the switching unit 140 enables a voltage of the DC charging power from the converter 120 to be provided by turning off a switch of a circuit to which the pack charging voltage source 150 is connected and turning on a switch to which the cell balancing voltage source 160 is connected. Accordingly, in the apparatus for providing a charging voltage 100 of the present invention, the cell balancing voltage is applied to the battery cells by the cell balancing voltage source 160, when the cell balancing is necessary, and the pack charging voltage is applied to the battery pack by the pack charging voltage source 150, when the cell balancing is not necessary, but the battery pack charging is necessary.

In addition, a switch element of the switching unit 140 may adopt a Metal Oxide Field Effect Transistor (MOSFET), a Bipolar Junction Transistor (BJT), or an Insulated Gate Bipolar Transistor (IGBT), etc.

Hereinafter, a driving method of the apparatus for providing a charging voltage 100 will be described.

The apparatus for providing a charging voltage 100 receives the AC input power incident from the outside through the input unit 110, and the received AC input power is converted to DC input power by the converter 120. When voltage imbalance occurs in the battery cells of the battery pack being in charge through the pack charging voltage source 150, the BMS checks the cell balance and transmits a cell balancing command to the MCU 130, when the cell balancing is necessary.

The MCU 130 having received the cell balancing command switches a circuit through the switching unit 140 and provides a voltage of the DC input power from the converter 120 to the cell balancing voltage source 160. Here, in the switching unit 140, the switch connected to the pack charging voltage source 150 is turned off and the switch connected to the cell balancing voltage source 160 is turned on.

In addition, when the cell balancing of the battery cell, which has been charged through the cell balancing voltage source 160, is completed, the BMS determines whether to perform the battery pack charging again or stop charging.

When determining that the battery pack charging is necessary, the BMS transmits a battery pack charging resume command to the MCU 130. The MCU 130, which has received the battery pack charging resume command, controls the switching unit 140 to switch the circuit such that the circuit, which has been connected to the cell balancing voltage source 160, is reconnected to the pack charging voltage source 150. Here, the switch connected to the cell balancing voltage source 160 is turned off and the switch connected to the pack charging voltage source 150 is turned on.

On the other hand, when determining to stop charging because the charging of the battery pack and cell balancing are completed, the BMS transmits a battery pack charging stop command to the MCU 130, and the MCU 130 controls the switching unit 140 to release the circuit connection with the pack charging voltage source 150 and the cell balancing voltage source 160. Here, in the switching unit 140, the switch connected to the cell balancing voltage source 150 is turned off.

As another driving method, there is a scheme for determining whether to perform cell balancing in real time. This scheme is disadvantageous in that it is required to measure a voltage and make determination in real time, which results in a complicated algorithm.

Accordingly, in the other driving method, the cell balancing is performed after the battery pack charging is completed.

When the battery pack charging is completed through the pack charging voltage source 150, the BMS measures each cell voltage value of the battery pack and compares the measured cell voltage value with a preset voltage value.

When the cell balancing is necessary as a result of the voltage comparison, the BMS controls the switching unit 140 to switch the circuit, which has been connected to the pack charging voltage source 150, to be connected to the cell balancing voltage source 160. Here, the switch connected to the pack charging voltage source 150 in the switching unit 140 is turned off and the switch connected to the cell balancing voltage source 160 is turned on.

In addition, the circuit connected to the cell balancing voltage source 160 is provided with the voltage of the DC input power from the converter 120.

Furthermore, when cell balancing of a cell, which has been charged through the cell balancing voltage source 160, is completed, the BMS transmits a battery pack charging stop command to the MCU 130, and the MCU 130 controls the switching unit 140 to release a circuit connection with the pack charging voltage source 150 and the cell balancing voltage source 160. Here, in the switching unit 140, the switch connected to the cell balancing voltage source 160 is turned off.

2. A Method for Providing a Charging Voltage According to an Embodiment of the Present Invention The method for providing a charging voltage of the present invention is a method for switching a pack charging voltage providing circuit to a cell balancing voltage providing circuit and providing a cell balancing voltage to a cell that requires cell balancing, when cell balancing is necessary at the time of charging a battery pack.

FIG. 2 is a flowchart of a method for providing a charging voltage according to an embodiment of the present invention.

Referring to FIG. 2, the method for providing a charging voltage according to an embodiment of the present invention performs charging a battery pack with power input from the outside (battery pack charging step S120), and checks whether a corresponding cell requires cell balancing, when voltage imbalance occurs in the cell of the battery pack being in charge (cell balance checking step S220). When it is checked that the cell balancing is necessary in the cell balance checking step S220, a switch is controlled to be connected to a circuit for performing cell balancing from a circuit connected to charge an existing battery pack (switch control step S230). Here, the circuit for performing the cell balancing means a circuit for providing a cell balancing voltage to the cell that requires the cell balancing.

Here, the switch control in the switch control step S230 is performed by turning off a switch for connecting the converter 120 with the pack charging voltage source 150, and turning on a switch for connecting the converter 120 with the cell balancing voltage source 160.

In addition, as an embodiment, the charging voltage for charging the battery pack is set to 16.8 V, but is not limited thereto.

In addition, the cell balancing voltage is the voltage magnitude used in the cell and set to 5 V as an embodiment, but is not limited thereto.

On the other hand, when additional charging is necessary for the battery pack after the cell balancing is terminated, the switch connected to the cell balancing voltage source 160 is turned off and the switch connected to the pack charging voltage source 150 is turned on, such that the circuit having been connected to perform the cell balancing is connected to the battery pack charging circuit again.

On the contrary, when charging of the battery pack is completed after the cell balancing termination, it is not necessary to proceed charging any more. Therefore, the switch connected to the cell balancing voltage source 160 is turned off in order to perform cell balancing.

The cell balance checking step S220 will be described in detail in relation to FIG. 3.

FIG. 3 is a flowchart of the cell balance checking step in the method for providing a charging voltage according to an embodiment of the present invention.

Referring to FIG. 3, voltages of two or more battery cells are periodically measured (cell voltage measuring step S221), and a voltage difference between cells are calculated using the two or more battery cell voltages measured in the cell voltage measuring step S221 (voltage difference calculating step S222).

In addition, the cell voltage difference calculated in the voltage difference calculating step S222 is compared with a voltage difference in a preset prescribed range (voltage difference comparing step S223).

When the cell voltage difference is larger than the voltage difference in the preset prescribed range in the voltage difference comparing step S223, the switch control step S230 is performed.

Here, a period is arbitrarily set by a user within a range in which the interval between periods does not lower a charging efficiency of the battery pack.

In addition, a method for calculating a voltage difference is a method for subtracting a voltage value of each cell from a maximum value among voltage values measured for each cell.

Furthermore, the preset prescribed range of the voltage difference is set to a range in which efficient battery pack charging is possible with a prescribed cell balancing voltage, while a time for charging a cell, which requires cell balancing, is reduced.

As another embodiment, whether to perform the cell balancing is determined in real time. This scheme is disadvantageous in that it is necessary to measure a voltage and make determination in real time, which results in a complicated algorithm.

Accordingly, the other embodiment is a method for performing the cell balancing after the battery pack charging is completed.

First, the charging of the battery pack is completed using power input from the outside, and voltages of two or more battery cells are measured.

In addition, each of the measured voltages of the two or more battery cells is compared with a preset prescribed voltage to determine that cell balancing is necessary for a cell of which measured cell voltage is smaller than the preset prescribed voltage value. Furthermore, switching is performed from a circuit connected to charge an existing battery pack to a circuit for performing the cell balancing.

After the cell balancing is terminated, since the battery pack charging is completed, the circuit for performing the call balancing, which is connected to the cell balancing voltage source 160, is switched off.

Although the technical spirit of the present invention has been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. An apparatus for providing a charging voltage, which provides a charging voltage through two voltage sources for providing different voltages, the apparatus comprising:
   an input unit for receiving AC input power from an outside;
   a converter for converting the AC input power from the input unit to DC input power;
   an MCU for controlling such that a voltage of the DC input power from the converter is delivered to one of the two voltage sources; and
   a switching unit connected to one voltage source circuit between the two voltage sources according to a control of the MCU and for delivering the voltage of the DC input power,
   wherein the two voltage sources is configured from:
   a pack charging voltage source for converting the voltage of the DC input power to output a pack charging voltage so as to charge a battery pack configured from two or more battery cells; and
   a cell balancing voltage source for converting the voltage of the DC input power to output a cell balancing voltage so as to charge a battery cell, which requires cell balancing, among the two or more battery cells.

2. The apparatus of claim 1, further comprising:
   a voltage output unit for receiving voltages from the pack charging voltage source and the cell balancing voltage source to output the voltages to the battery pack or the two or more battery cells.

3. The apparatus of claim 1, wherein the switching unit is configured from a plurality of switches connected to the MCU and the converter.

4. A method for providing a voltage so as to make voltages of two or more battery cells uniform, the method comprising:
   a battery pack charging step for charging a battery pack configured from the two or more battery cells;
   a cell balance checking step for checking whether cell balancing is necessary for a cell in the battery pack being in charge due to occurrence of voltage imbalance in the cell; and
   a switch control step for controlling a switch to connect a circuit having been connected to a pack charging voltage source to a cell balancing voltage source so as to provide a cell balancing voltage to a cell, when it is checked that the cell balancing is necessary for the corresponding cell.

5. The method of claim 4, wherein the cell balance checking step comprises:
   a cell voltage measuring step for periodically measuring each voltage of the two or more battery cells;

a voltage difference calculating step for calculating a voltage difference between cells using the two or more battery cell voltages measured in the cell voltage measuring step; and a voltage difference comparing step for comparing the voltage difference between cells calculated in the voltage difference calculating step with a voltage difference in a preset prescribed range.

6. The method of claim 5, wherein, when the voltage difference between cells is greater than the voltage difference in the preset prescribed range in the voltage difference comparing step, the switch control step is performed.

7. The method of claim 4, wherein, in the switch control step, a switch for connecting the converter and the pack charging voltage source is turned off, and a switch for connecting the converter and the cell balancing voltage source is turned on.

8. The method of claim 4, wherein, when additional charging is necessary for the battery pack after termination of the cell balancing, a switch of a circuit in which the converter and the cell balancing voltage source are connected is turned off so as to perform cell balancing, and a switch for the converter and the pack charging voltage source is turned on so as to be connected to a battery pack charging circuit again.

9. The method of claim 4, wherein, when it is determined that charging of the battery pack is completed after termination of the cell balancing, a switch of a circuit in which the converter and the cell balancing voltage source is connected is turned off.

* * * * *